United States Patent [19]

Bischoff et al.

[11] Patent Number: 5,373,408
[45] Date of Patent: Dec. 13, 1994

[54] CONFIGURING DOMAIN PATTERN IN THIN FILMS OF MAGNETIC HEADS

[75] Inventors: Peter G. Bischoff, Cupertino; Hua-Ching Tong; Johnny C. Chen, both of San Jose, all of Calif.

[73] Assignee: Read-Rite Corporation, Milpitas, Calif.

[21] Appl. No.: 251,304

[22] Filed: May 31, 1994

Related U.S. Application Data

[63] Continuation of Ser. No. 915,515, Jul. 20, 1992, abandoned.

[51] Int. Cl.[5] .......................... G11B 5/31; G11B 5/187
[52] U.S. Cl. ..................................... 360/126; 360/122
[58] Field of Search ..................... 360/126, 125, 122

[56] References Cited

U.S. PATENT DOCUMENTS

| | | | |
|---|---|---|---|
| 4,242,710 | 12/1980 | Hempstead et al. | 360/113 |
| 4,550,353 | 10/1985 | Hirai et al. | 360/125 |
| 4,589,042 | 5/1986 | Anderson et al. | 360/125 |
| 4,716,484 | 12/1987 | Kaminaka et al. | 360/126 |
| 4,951,166 | 8/1990 | Schewe | 360/126 |
| 5,047,886 | 9/1991 | Toyoda et al. | 360/126 |
| 5,126,907 | 6/1992 | Hamakawa et al. | 360/126 |
| 5,198,949 | 3/1993 | Narisawa et al. | 360/126 |
| 5,218,499 | 6/1993 | Wada et al. | 360/126 |

FOREIGN PATENT DOCUMENTS

| | | | |
|---|---|---|---|
| 63-247906 | 10/1988 | Japan | 360/113 |
| 01-102712 | 4/1989 | Japan | 360/122 |

OTHER PUBLICATIONS

"Film Head Structure Optimized for Writing", IBM Technical Disclosure Bulletin, vol. 31, No. 3, pp. 291–292, Aug. '88.

"Thin Film Magnetic Heads", K. E. Peterson, IBM Technical Disclosure Bulletin, vol. 21, No. 12, p. 5002, May '79.

Primary Examiner—Stuart S. Levy
Assistant Examiner—Craig A. Renner
Attorney, Agent, or Firm—Nathan N. Kallman

[57] ABSTRACT

A thin film magnetic head is fabricated with shaping magnetic thin films, preferably formed of Permalloy, which have a stepped configuration. The thin films are deposited between the insulation layer surrounding the electrical coil and below the second pole layer P2 to form a double yoke. The thin films have corners at the stepped areas which pin the domain sites so that the magnetization of the P2 layer is properly aligned, thereby improving the data signal that is being recorded.

7 Claims, 1 Drawing Sheet

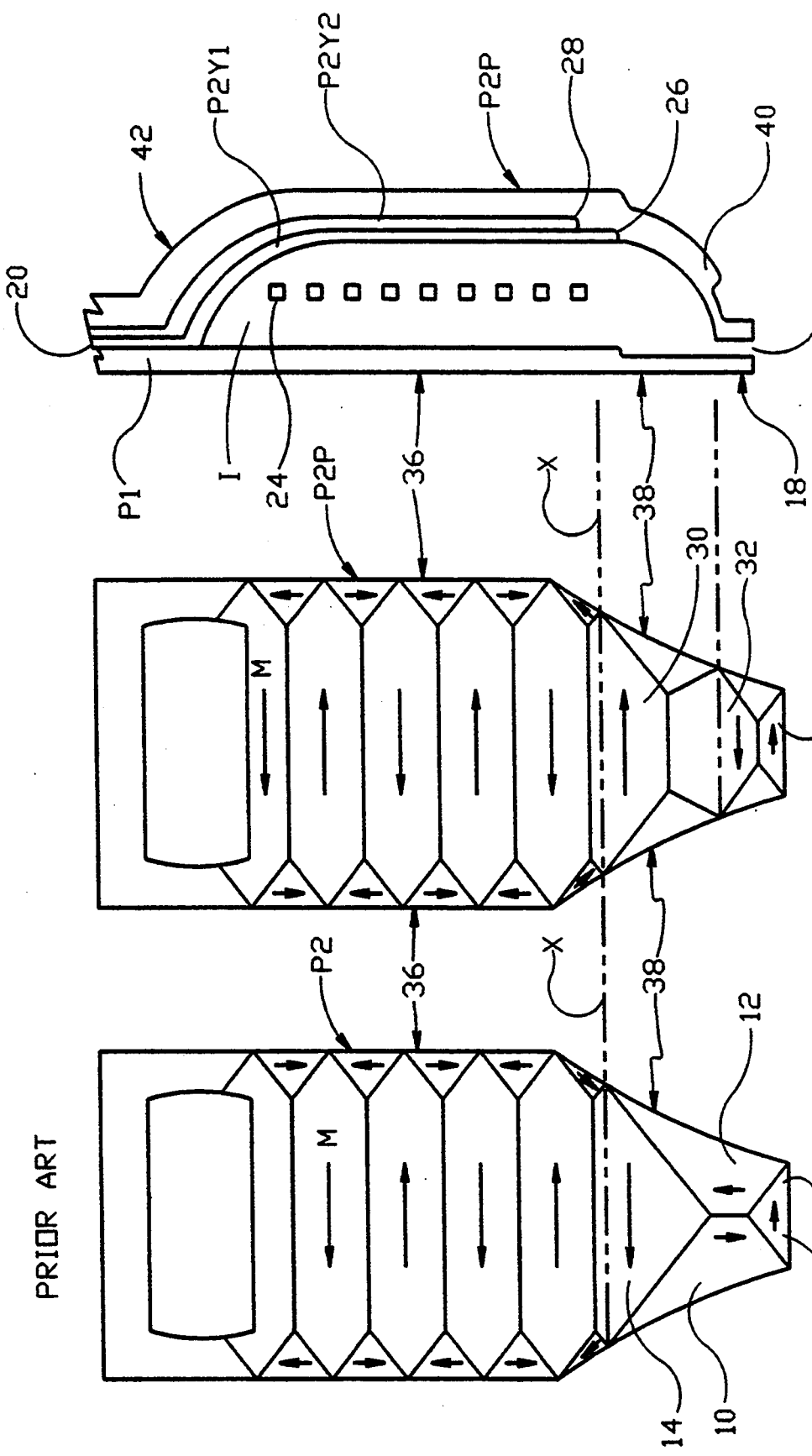

CONFIGURING DOMAIN PATTERN IN THIN FILMS OF MAGNETIC HEADS

This application is a continuation of U.S. application Ser. No. 07/915,515, filed Jul. 20, 1992, now abandoned.

FIELD OF THE INVENTION

This invention relates to a thin film magnetic head having a structure that corrects for instability of magnetization in the material of the pole layers of the magnetic yoke of the head.

DESCRIPTION OF THE PRIOR ART

A typical thin film magnetic head or transducer is configured with two magnetic thin film layers, formed of Permalloy material, which are generally designated as the P1 and P2 poles. The P1 and P2 layers sandwich an electrical coil encompassed by an insulating material. The coil portion and the back closure region constitute a relatively large major portion of the head structure, whereas the pole tip region adjacent to the transducing gap is narrowed to approximate a relatively smaller funnel-like portion. It has been observed that domain walls in the Permalloy material of the funnel-like pole tip portion are orthogonally disposed and not aligned with the desired magnetization along the easy axis. This misalignment of the domain walls is caused by compressive stress which occurs at the narrowed pole tip region. As a result, during recording of data with the thin film magnetic head, glitches occur at the end of the write signal, which is described as the "wiggle" phenomenon. These glitches which are experienced in the P2 layer tend to distort the recorded data and introduce undesirable signal delay in the write signal waveform.

SUMMARY OF THE INVENTION

An object of this invention is to provide a thin film magnetic head in which the domain walls are in substantial alignment in the pole tip region of magnetic pole layers of the head.

Another object of this invention is to provide a thin film magnetic head with minimal wiggle and an improved recorded data signal.

According to this invention, a thin film magnetic head is fabricated with two shaping layers, designated as P2Y1 and P2Y2. The shaping layers are deposited above the insulation surrounding the electrical coil and prior to the formation of the P2 pole layer of the magnetic yoke. The two shaping layers are configured to define steps having corner regions that serve as domain pinning sites. In this way, the domain configuration of the P2 pole is anchored to a desired fixed pattern so that data signal that is recorded is not adversely affected.

BRIEF DESCRIPTION OF THE DRAWINGS

The invention will be described in greater detail with reference to the drawings in which:

FIG. 1 is a plan view in section of a P2 pole layer of a typical prior art magnetic yoke of a thin film magnetic head;

FIG. 2 is a plan view in section of a P2 pole layer of a magnetic yoke, made in accordance with this invention; and FIG. 3 is a cross-sectional view of a thin film magnetic transducer, using a double yoke according to the invention.

DETAILED DESCRIPTION OF THE INVENTION

FIG. 1 illustrates a pole layer P2 of a magnetic yoke typically used with a prior art thin film magnetic head. Alignment of the domain walls in the P2 pole layer, which is preferably made of Permalloy, is shown by the arrows in FIG. 1. In the prior art structure, the domain walls in the narrow pole tip region adjacent to the transducing gap are not aligned unidirectionally along the easy axis of magnetization. The direction of the easy axis is represented by the horizontal arrows M. Specifically, the magnetization of domains 10 and 12 are oriented orthogonally to the easy axis M and to domains 14 and 16 at the pole tip region 18. The domain orientation results from domain shifting which is caused by compressive stress that is produced by the narrowing at the pole tip region 18 of the P2 layer. Variations in alignment of adjacent domains result in the wiggle effect. Wiggle causes unwanted signal delay and undesirable glitches at the end of signal pulses which are being recorded, producing distortion in the recorded data signal.

Another problem that occurs during the write process with a thin film magnetic head is that the temperature of the Permalloy increases significantly. The Permalloy material has a different coefficient of thermal expansion than the other materials used in the head structure, such as the insulating material. This difference manifests itself by developing magnetostriction and stress. This stress affects head sensing of the data signal whereby the recorded signal is distorted and subject to error upon readout.

FIG. 3 depicts a thin film transducer or head 42 which includes a back closure 20, transducing gap 22, and an electrical coil structure 24 for connection to external circuitry, as is well known in the art. The coil 24 is encompassed by insulation material I between the P1 layer and the P2 layers. A substrate, seed layers and an overcoat layer are not shown, since description of these components are not necessary for explanation of this invention.

To overcome the problems of stress and resultant domain misalignment, in accordance with this invention, thin film layers of Permalloy P2Y1 and P2Y2 are successively deposited, by conventional photolithographic and masking processes, prior to deposition of the P2 layer. By way of example, the P2P layer is made to be about 3.50 microns thick and the P2Y1 and P2Y2 films are each about 0.80 microns thick or greater. The thin film head structure in a sense comprises a double magnetic yoke that includes Permalloy layers P1, P2P, P2Y1 and P2Y2. The P2Y1 and P2Y2 layers are shaped to form a double step configuration, including steps 26 and 28 respectively, between the insulating layer I and the P2P layer, as shown in FIG. 3. The step 28 of the P2Y2 thin film is preferably located approximately where the P2P pole layer starts to curve from the major portion 36 of the head into the funnel-like portion 38. This location of the step or corner 28 is substantially in line with the end of coil 24 closest to the pole tip region 18. The step 26 of the P2Y1 thin film is located approximately at the center of the curved section 40 between the major portion 36 of the head and the pole tip region 18 in substantial alignment with dashed line X extending between the figures of the drawing.

The shaped corners or steps 26 and 28 of the stepped configuration formed by the P2Y1 and P2Y2 layers act as domain pinning sites. The double yoke with the steps and corners provides an increase in magnetostatic energy associated with the P2P magnetic pole. Thus the magnetization is rotated about 90° within the plane of the P2P layer so that domain walls 30, 32 and 34 are shifted and aligned, as shown in FIG. 2. The energy level of magnetization is minimized and the domain walls are aligned along an easy axis, thereby virtually eliminating the wiggle effect. As a result, distortion of recorded data signals is minimized and data signal recording is effectively enhanced.

What is claimed is:

1. A thin film magnetic head comprising:
   a magnetic yoke including first and second pole layers formed of a magnetic material having multiple domain walls, said yoke including pole tips and a transducing gap defined by said pole tips;
   an electrical coil for connection to external circuitry;
   said yoke being formed with a major portion including said coil and a funnel-like portion including said pole tips;
   an insulating material surrounding said coil, said insulating material and said coil being disposed between said first and second pole layers;
   first and second shaping magnetic thin films of different lengths and each of said shaping magnetic thin films having upper and lower surfaces disposed between said insulating material and said second pole layer for aligning said multiple domain walls in said funnel-like portion of said second pole layer along an easy axis, said second shaping magnetic thin film being disposed directly on said first shaping magnetic thin film so that its entire lower surface is in direct contact with said first shaping magnetic thin film, said upper surface of said second shaping magnetic thin film being disposed directly under and in direct contact with the lower surface of said second pole layer, said lower surface of said first shaping magnetic thin film being in direct contact with said insulating material surrounding said coil.

2. A thin film magnetic head as in claim 1, wherein said second pole layer of said yoke is about 3.5 microns thick and said shaping magnetic thin films are each about 0.80 microns thick.

3. A thin film magnetic head as in claim 1, wherein said second pole layer comprises a curved portion starting at the end of said major portion of said yoke closest to said transducing gap and progressing towards said pole tips.

4. A thin film magnetic head as in claim 3, wherein said end of said major portion is in substantial alignment with the end of said coil closest to said transducing gap.

5. A thin film magnetic head as in claim 1, wherein said first and second shaping magnetic thin films comprise first and second steps respectively, said steps being nonaligned and spaced from each other.

6. A thin film magnetic head as in claim 5, wherein said first step is located closer to said transducing gap than said second step.

7. A thin film magnetic head as in claim 5, wherein said first step is located approximately at the area at the center of said curved portion.

* * * * *